Nov. 22, 1960 — R. W. BOGLE — 2,961,652

RADIO ALTIMETERS

Filed Dec. 16, 1948 — 2 Sheets-Sheet 1

INVENTOR:
Robert W. Bogle

United States Patent Office 2,961,652
Patented Nov. 22, 1960

2,961,652

RADIO ALTIMETERS

Robert W. Bogle, Silver Spring, Md., assignor to the United States of America as represented by the United States Atomic Energy Commission Filed Dec. 16, 1948, Ser. No. 65,693

4 Claims. (Cl. 343—13)

This invention relates to a radio device for measuring the distance between itself and a distant object. More particularly, it relates to a radio altimeter for indicating the height of a vehicle above the earth.

The radio altimeters of the prior art utilize a measuring device for indicating the time of travel of a radio wave to and from the earth. Generally, these systems fall into types in two categories. The type in one category measures the time of travel of a short burst of radiant energy from the device to the earth and back to the device. The type in the second category measures the altitude of a vehicle by measuring an increment in frequency change of a wave having a known rate of frequency change in travelling to the earth and back to the vehicle.

Systems of the prior art in either category are complex in organization. The present invention is directed to a novel type of radio altimeter of the first category which is rugged, reliable and simple.

The altimeter system of the present invention utilizes a super-regenerative oscillator for both sending and receiving in a manner which utilizes the principles disclosed by Horace R. Crane in copending application Serial Number 65,695, filed December 16, 1948, now abandoned.

The advantages inherent in the use of the super-regenerative principle spring from an unusual characteristic of this type of circuit. This characteristic is the generation of noise energy due to irregular oscillating behavior under normal free-running conditions. Under a condition such that oscillatory energy is impressed on the super-regenerative circuit just prior to the time oscillation would normally start due to thermal noise, the oscillations start at regular intervals and are of equal duration. It follows that under this condition, the noise generation disappears and a noise dip occurs.

It follows that under the condition that a super-regenerative oscillator is provided with an antenna and is activated for short periods alternately for sending and sensing with a selected interval between the activations that the noise generated by the sensing oscillations markedly decrease upon the occurrence of that distance between a reflecting surface and the oscillator which returns energy to the oscillator at the end of the selected interval.

Further, if the time interval between sending and sensing oscillations is cyclically varied by small increments from a small value to a large value, the device ranges over a distance having a small value to a large value. The occurrence of a reflecting object anywhere within the range is indicated by a noise dip. It follows that the means for cyclically varying the interval between sending and sensing oscillations can be calibrated directly in distance and the calibration read at the time of occurrence of a noise dip, gives the distance of the object.

In accordance with the present invention, the distance between the device and earth is scanned and the means for cyclically varying the interval between sending and sensing oscillations is so arranged that it seeks that value of interval which corresponds to the actual altitude. Accordingly, upon the occurrence of the noise dip corresponding to the actual altitude, the scanning means locks in with the noise dip. The locking in with the noise dip is accomplished by a hunting technique in which the boundary of the noise dip reverses the direction of hunting. Therefore, if the altitude changes, the boundary of the noise dip moves thereby causing the scanning means to hunt in a new location corresponding to the new altitude. Therefore, since the means for determining the time interval is calibrated in distance, the actual altitude is always indicated.

In order to avoid the occurrence of noise dips at multiples of the basic distance corresponding to a time interval between sending and sensing oscillations, it is preferred to use the mode of activation presented in copending application of Horace R. Crane et al., Serial Number 65,696 filed December 16, 1948. This mode is the production of pairs of oscillations in which a sending oscillation is followed after the ranging interval by a sensing oscillation, and a longer interval preferably equal to 15 to 30 times the ranging interval, occurs between such pairs of oscillations.

The source for activating pulses preferably includes an assymmetrical multi-vibrator of the cross-coupled grid anode type having a first pulse length equal to the ranging interval and a second pulse length equal to the long interval between pairs of pulses. Such a modulator is shown in my copending application Serial Number 65,-692, filed December 16, 1948, of which application the present application is a continuation-in-part. The multi-vibrator disclosed in my earlier application provides for adjustability in the pulse length by variation in the time constants of the multi-vibrator. The multi-vibrator pulses are differentiated so that modulation pulses are derived corresponding to the leading and trailing edges of the multi-vibrator pulses. It follows that variation of the circuit components which control the short pulse length provide a means for controlling the ranging interval. In accordance with the present invention, I provide motor means for cyclically varying the length of the short multi-vibrator pulses. I also provide means for creating an electrical quantity in accordance with a noise dip and means sensitive to the electrical quantity for seeking that value of short pulse length which corresponds to the noise dip. The motor means for varying the short pulse length is calibrated directly in distance or altitude.

It is, therefore, an object of this invention to provide a simplified radio altimeter.

Another object is the utilization of a super-regenerative circuit for altitude measuring purposes.

Still another object of this invention is to provide super-regenerative apparatus capable of scanning a distance and indicating the occurrence of a reflecting object within said distance.

Still another object of this invention is to provide super-regenerative apparatus capable of scanning a distance and upon the occurrence of a reflecting object within that distance, locking in on said object and continuously indicating the intervening separation between the device and the object.

Another object is the provision of means for generating modulation pulses with a time spacing corresponding to a geometric quantity.

Further objects and features of the invention will become apparent to those skilled in the art upon reference to the accompanying specification and drawings in which.

Figure 1:
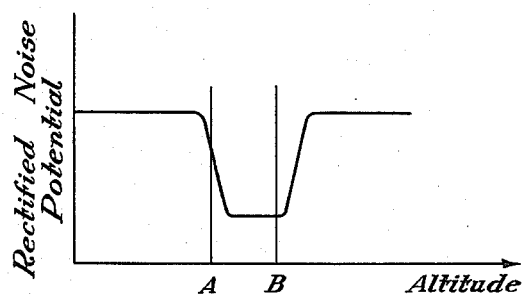
Figure 1 shows a rectified noise potential dip obtained in certain parts of the device of the present invention when the altitude corresponds to the ranging interval.

Referring to Figure 1, the relation between rectified noise potential and altitude in the vicinity of that altitude in which the sending oscillations are returned to the device in proper phase to control the sensing oscillations is shown. The high potential outside of the noise dip may be used in a manner later to become apparent to bias negatively a tube which in turn controls a motor reversing relay. Under the condition of high noise generation such as at A, the relay is in a position to cause a motor associated therewith to drive the ranging system toward a higher altitude. Upon the occurrence of that pulse interval at which $$t \text{ in microseconds} = \frac{2D}{C}$$

where D is the altitude of the vehicle on which the device is carried and C is the velocity of light, the noise is suppressed.

As the ranging interval, i.e., the multi-vibrator short pulse, lengthens, the system passes into the noise dip whereupon the rectified potential decreases with a resultant positive change of bias on the relay tube. At the point B, for instance, shown in Figure 1, the bias change is sufficiently great to increase the tube current to the point where the relay is made to reverse the motor. The system now moves back out of the noise dip thereby increasing the noise generation. At the point A, the rectified potential has again increased to the point at which the bias on the tube decreases the tube current and reverses the relay. This causes the motor to again drive the system toward the point B and the cycle continues to repeat.

In the event the vehicle supporting the device changes its altitude, the noise dip moves thereby causing the motor to shift to new limits of hunt.

The foregoing described continuous hunting type of ranging system is well suited for altitude measurement because of its simplicity of operation. In such a system, deviation correction is applied at a constant rate and this rate is easily made of a value somewhat greater than any expected rate of change in actual altitude. It has been found that cycling at a rate of about once per second is sufficient to correct for a change in altitude up to a rate of about 1000 feet per second. In most applications, such as the use of the device on aircraft, such an extreme rate of deviation correction is in excess of requirements, and is readily modified accordingly.

The optimum width of a hunting interval AB is determined by several factors. It is characteristic of a vacuum tube operated relay that the relay requires a greater current for closing than for holding. Assuming that the difference in current between closing and drop-out is known for a given relay, then the interval AB may be controlled by the amplitude of signal supplied to the relay tube; that is, by the amount of amplification of the rectified noise voltage and by the transconductance of the relay controlling tube. This relation can be stated as follows:

Distance in feet, $AB$ $$= \frac{1}{\frac{\Delta \text{ noise}}{d} \times V.G. \times Gm(I_{p \text{ close}} - I_{p \text{ open}})}$$

wherein $\Delta$ noise is the change in noise between Figure 1, A and B, $d$ is the distance in feet corresponding to the interval B—A, V.G. is the voltage gain of the amplifier and $Gm$ is the transconductance of the relay control tube.

If the interval is made too small, the bias change representing it becomes small in comparison with the "flicker" in noise generation due to small changes in ground reflectivity, and the noise dip may be "lost" necessitating a complete searching cycle of the system before it again finds the noise dip. If the interval is made too long, the hunting within the noise dip becomes apparent at the indicating meter.

Figure 2:
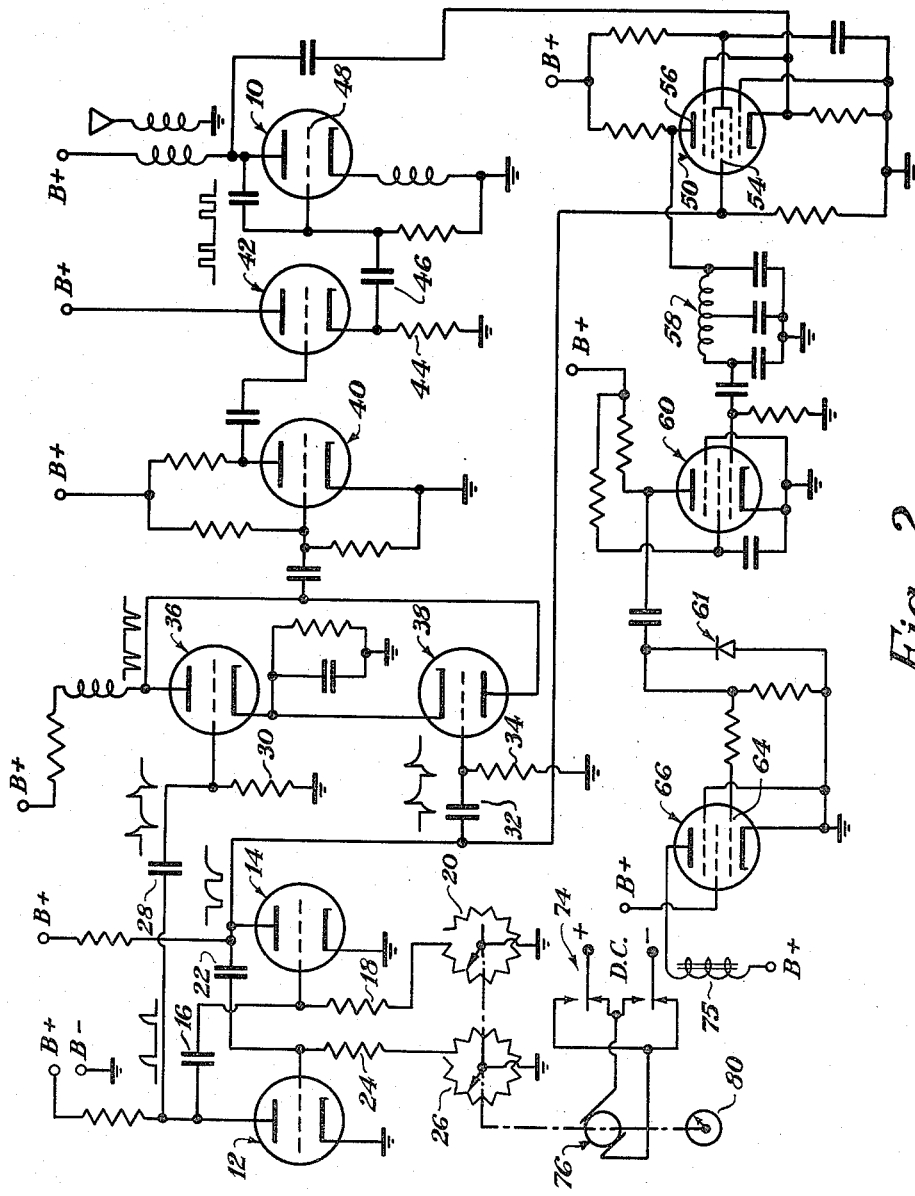
Figure 2 is a circuit diagram of a preferred embodiment of my invention.

Reference is now made to Figure 2 for a detailed description of the preferred embodiment of an altimeter constructed in accordance with the present invention. A super-regenerative oscillator is denoted generally by the reference numeral 10. This oscillator is activated alternately with short and long intervals between oscillations.

The source of the activating pulses is a modulator including a multi-vibrator having cross-coupled tubes 12 and 14. It is assumed that the length of the short pulses is determined mainly by a network comprising condenser 22, fixed resistor 24 and variable resistor 26. The length of the long pulses, that is, the interval between short pulses, is controlled mainly by a network comprising condenser 16, fixed resistor 18 and variable resistor 20. It is generally preferred that the time constants of the respective networks are so proportioned that the short pulse is of the order of about ¹⁄₂₀, the length of the long pulse. Oppositely directed pulses are always generated simultaneously at the anodes of both multi-vibrator tubes.

The length of the short pulse is controlled by variation of of variable resistor 26. It is apparent that a shortening or lengthening of the short pulse results in an increase or decrease respectively in the repetition rate of the multi-vibrator. To the end that the repetition rate remains constant, the variable resistor 20 which controls the long interval between pulses is ganged in a reverse direction to variable resistor 26. It follows that by suitable selection of the values of the variable resistors 20 and 26 that any change in length of the short pulses is accompanied by a change in the opposite direction of the pulse interval so that the repetition rate remains substantially a constant.

The pulses from the multi-vibrator tubes are processed in the manner described in referenced copending application Serial Number 65,692, filed December 16, 1948. In brief, the pulses pass through separate differentiating networks comprising condenser 28 and resistor 30, and condenser 32 and resistor 34 respectively. The differentiating networks result in the creation of pulses of opposite polarity at the leading and trailing edges of each of the multi-vibrator pulses. The differentiated pulses from one differentiating network are impressed on tube 36 and the pulses from the other differentiating network are impressed on tube 38. These tubes are provided with a negative bias such that only a portion of the positive input differentiated pulses appear in the anode circuits thereof. There, therefore, appears at the anode of tube 36, a negative pulse corresponding to the leading edge of the short multi-vibrator pulse, and there appears at the anode of tube 38, a negative pulse corresponding to the trailing edge of each short multi-vibrator pulse. The anodes of tubes 36 and 38 are connected together so that there appears on the common connection a sequence of negative pulses spaced alternately by the width of the short multi-vibrator pulse and the width of the long multi-vibrator pulse. These sequential pulses are impressed on an amplifier tube 40 which is provided with zero or such a small value of negative bias that the negative going input pulses exceed the cut-off value of grid potential. Tube 40, therefore, presents in its output, clipped positive pulses. These pulses are impressed on a cathode follower tube 42. The positive pulses appear across the cathode resistor 44 and are impressed on the grid of the super-regenerative oscillator tube by means of coupling condenser 46.

The impression of the positive modulating pulses on the oscillator, taken with grid excitation during oscillating conditions, results in rectification by the oscillator grid 48 such that the oscillator is biased well below cut-off during the intervals between activating pulses.

The noise generated by the oscillator is impressed on a gating stage including tube 50. The necessity for a gating stage arises from the fact that the noise generated by the sending pulses is not suppressed even under an on-range condition, and in order to prevent this noise from obscuring the noise dip of the sensing oscillations, the gating stage is provided to prevent the former noise from passing on to the indicating portions of the apparatus. The gating tube is shown to be of a multi-control-grid type, although any type of grid controlled tube can be used. One of the control grids, 54, is coupled to the anode of multi-vibrator tube 14 so that at the creation of each negative multi-vibrator pulse, a negative pulse is impressed on the gating tube thereby blocking it. The noise energy from the oscillating tube is impressed upon the cathode of tube 50 and it follows that only the noise energy corresponding to the second or sensing oscillations appears at the anode 56 thereof.

The noise energy generated during the sensing oscillations contains extraneous noise energy due to the repetition and microphonic frequencies. The extraneous frequencies are eliminated by high cut-off filter 58 and the noise energy only is amplified by tube 60. Tube 60 is provided with zero bias so that the amplitude of the positive input signal causes the tube to operate up to the saturation point. This gives a limiting effect which removes amplitude variations from the noise energy which may occur due to variations in energy radiated or reflected.

The amplified noise energy in the output of tube 60 is impressed on rectifier 61 which thereby creates a unidirectional potential. The negative unidirectional potential is impressed on grid 64 of relay control tube 66. It follows that in the absence of the receipt of reflected energy in proper phase, the sensing oscillations contain noise energy which is rectified and which biases tube 66 to a condition of low inter-electrode current. Upon the occurrence of a reflecting object at a distance corresponding in time to the interval between activating pulses, the noise energy generated by the sending oscillations, dips in value and the negative potential on tube 66 decreases causing an increase in current.

The changes in current conduction of tube 66 are utilized to effect a continuous reading of altitude in a manner as follows: The pulse interval determining resistor 26 is normally caused to continuously vary through a wide range from a low value to a high value by a motor 76. This causes the width of the multi-vibrator pulses and therefore the interval between sending and sensing oscillator activations to vary over a wide range in time and this corresponds in turn to searching a wide range of distance. The above described condition arises whenever the device is not in an on-range position. Under the last described condition, the amount of current passing through tube 66 is low in value.

Motor reversing relay 74 having an actuating coil 75 is provided with the actuating coil in series with inter-electrode space of tube 66. It is assumed under this condition that the contacts of the relay are in the upper position and thereby connect a D.C. potential to the motor 76 in such manner that it rotates clock-wise. The variable resistor 26 accordingly repeatedly varies from a low value to a high value to thereby cause the device to scan from short distances to long distances.

Upon the occurrence of the receipt of a reflection of energy emitted by a sending oscillation during a sensing activation, the noise energy decreases, the anode current of tube 66 increases and the motion of the variable resistor actuating motor 76 is reversed in direction of rotation.

Referring again to Figure 1, the reversal in direction of motor 76 causes the interval between actuating pulses to decrease and the noise energy to increase with the result that the rectified potential increases in value to the point A. The increase in bias on tube 66 causes the relay 74 to again reverse and lengthen the time interval between activating pulses so that the cyle is continually repeated from a point within the noise dip to a point within the boundary of the noise dip.

Assuming that a change in altitude occurs, the noise dip correspondingly changes in position so that the motor is caused to turn one way or another to restore the hunting condition within the limits A and B.

An indicator 80 is mechanically coupled to the motor 76 or variable resistor 26 and its calibration is so coordinated with the length of the short multi-vibrator pulse that it reads directly in distance or altitude.

Figure 3:
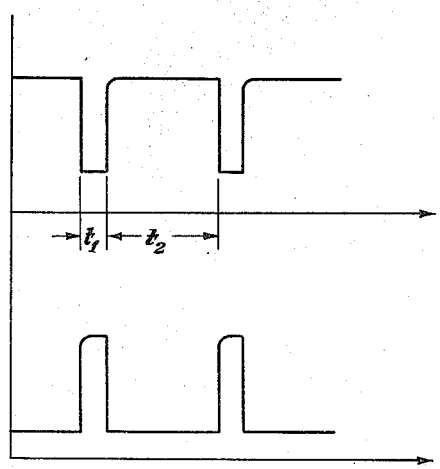
Figure 3 is a diagrammatic showing of multi-vibrator pulses useful in explaining certain aspects of the invention.

It was noted previously that variable resistor 20 which controls the width of the long multi-vibrator pulse is coupled to the variable resistor 26 which controls the width of the short multi-vibrator pulse. The reason for this becomes clear with reference to Figure 3. The pulses in the top and bottom line correspond to those created at the anode of tubes 14 and 12 respectively. Interval $t_1$ is controlled by variable resistor 26. Interval $t_2$ is determined by variable resistor 20. The repetition period is $t_1$ plus $t_2$. Therefore, any change $\Delta t_1$ in the length of $t_1$ causes an equal change $\Delta t_1$ in the repetition interval, which may, however, be balanced by an equal and opposite change $\Delta t_2$ in $t_2$. The variable resistor 20 is therefore coupled to varibale resistor 26 in such manner as to vary its resistance in a direction equal and opposite to that of resistor 26.

There has, therefore, been described a simple ranging device which is capable of scanning over a distance and indicating the occurrence of and the distance to an object in its path of action.

It will thus be seen that there has been provided by this invention, a method and apparatus in which the various objectives hereinabove set forth are successfully achieved. As various possible embodiments might be made of the mechanical features of the above invention, and as the art herein described might be varied in various parts, all without departing from the scope of the invention, it is to be understood that all matter hereinbefore set forth or shown in the accompanying drawings is to be interpreted as illustrative and the invention is to be restricted only by the appended claims as interpreted in view of the prior art.

What is claimed is:

1. In a radio altimeter, a super-regenerative oscillator having alternate phases of wave energy sending and wave energy sensing spaced by a ranging interval, said oscillator having the characteristic of generating noise energy except under the condition that the value of said ranging interval is in the neighborhood of twice the altitude divided by the velocity of light, means for cyclically varying the ranging interval between a small value and a large value, means responsive to the disappearance of noise energy for limiting the motion of the ranging interval varying means to small cyclical variations within the neighborhood of the on-range interval, indicating means coupled to said ranging interval varying means and calibrated in accordance with one half the product of the ranging interval times the velocity of light whereby the actual altitude is indicated.

2. In a radio ranging device, an oscillator having alternate phases of wave energy sending and wave energy sensing spaced by an intervening interval, said oscillator being adapted to generate noise energy during the sensing phase in the absence of an impinging signal during the sensing phase, and to generate reduced noise energy in the form of a noise dip in response to the receipt of a signal during the sensing phase, means for varying said intervening interval in a selected direction, means responsive to a reduction in noise energy for reversing the direction of the variation of said interval whereby said interval varying means is caused to reversably cycle between the noise dip and a boundary of the noise dip, an indicator coupled to said interval varying means, said indicator being calibrated in terms of one half the product of the interval times the velocity of light whereby the distance between the ranging device and a reflecting object is directly indicated.

3. A radio altimeter comprising a super-regenerative oscillator, means for activating said oscillator for short periods spaced alternately by a short interval and a long interval, said super-regenerative oscillator having the characteristic of generating noise energy during activation thereof in the absence of the receipt of reflection from the earth of energy of a preceding oscillation in proper phase, means for rectifying the noise energy of each oscillation following said short interval whereby a unidirectional potential is created having a large magnitude corresponding to a short interval having any value other than twice the actual altitude divided by the velocity of light and having a low magnitude corresponding to a short interval equal to twice the actual altitude divided by the velocity of light, motor means for cyclically varying the length of said short interval, and means responsive to said unidirectional potential of low magnitude for limiting the motion of said motor means to within the region of said low magnitude of potential whereby the position of said motor means in its limited motion position is an indication of said actual altitude.

4. In a radio altimeter, a super-regenerative oscillator having the characteristic of generating noise energy in the absence of the impression thereon of starting energy prior to the start of oscillations due to thermal agitation, means for rendering the oscillator normally quiescent and means for activating the oscillator in pairs in a sequence in which a sending oscillation is followed after a short interval by a sensing oscillation and a longer interval intervenes before such pairs of oscillations, means for varying said short interval cyclically in a selected direction from a low value to a high value corresponding to searching a distance from a low selected value to a high selected value in accordance with the quotient of twice the selected distance divided by the velocity of light, and means for inversely varying the long interval so that the sum of the long and short intervals is a constant, means for rectifying the noise energy of the sensing oscillations, means responsive to a decrease in the rectified noise energy for reversing the direction of the variation in length of said intervals whereby the interval varying means reversably cycles from the minimum value of noise to a value of noise intermediate the normal noise generation and the said minimum value; an indicator coupled to said interval varying means and being calibrated in accordance with one half the product of the short interval and the veloctiy of light whereby the actual altitude is directly indicated.

References Cited in the file of this patent

UNITED STATES PATENTS

| | | |
|---|---|---|
| 2,422,382 | Winchel | June 17, 1947 |
| 2,431,344 | Reeves | Nov. 25, 1947 |

FOREIGN PATENTS

| | | |
|---|---|---|
| 581,168 | Great Britain | Oct. 3, 1946 |
| 581,982 | Great Britain | Oct. 31, 1946 |